United States Patent [19]

Drummond et al.

[11] 3,828,987
[45] Aug. 13, 1974

[54] DISPENSING MICROPIPETTE APPARATUS HAVING DISPOSABLE PARTS FOR DELIVERING A PRESELECTED QUANTITY OF FLUID

[75] Inventors: Michael E. Drummond, West Chester; John E. Robinson, Springfield, both of Pa.

[73] Assignee: Drummond Instrument Company, Broomall, Pa.

[22] Filed: June 2, 1972

[21] Appl. No.: 259,177

Related U.S. Application Data

[63] Continuation-in-part of Ser. No. 75,203, Sept. 24, 1970.

[52] U.S. Cl............................. 222/386, 128/278
[51] Int. Cl.............................................. G01f 11/00
[58] Field of Search...... 128/218 P, 218 PA, 218 C, 128/278, 2 F; 222/386, 309, 327, 326

[56] References Cited
UNITED STATES PATENTS 2,622,595   12/1952   Kollsman ...................... 128/218 C
2,842,127   7/1958    Everett ......................... 128/218 P
3,327,904   6/1967    Goda et al. .................... 128/218 C
3,380,450   4/1968    Adelberger .................... 128/218 R
3,606,086   9/1971    Drummond et al............. 222/309 X Primary Examiner—Stanley H. Tollberg
Assistant Examiner—John P. Shannon
Attorney, Agent, or Firm—Shlesinger, Arkwright, Garvey & Dinsmore

[57] ABSTRACT

This invention is a dispensing micropipette apparatus having disposable parts for delivering a preselected quantity of fluid. The apparatus includes a capillary tube through which a wire plunger extends, the wire plunger being secured at one end to a holder. One end of the capillary tube is reduced in diameter to provide an end wall portion serving as a stop engaged by a stop member mounted on the wire plunger at a predetermined distance from the lower end of the plunger. The engagement of the stop member with the stop means positively and automatically controls the amount of fluid drawn into the capillary tube without visual determination of the amount drawn therein.

6 Claims, 6 Drawing Figures

PATENTED AUG 13 1974 3,828,987
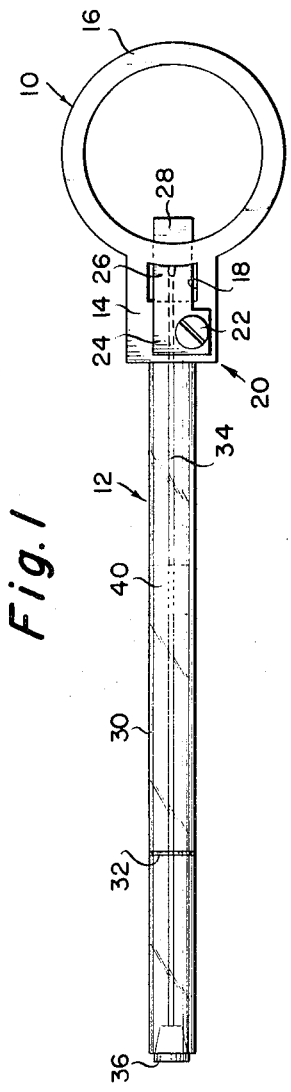
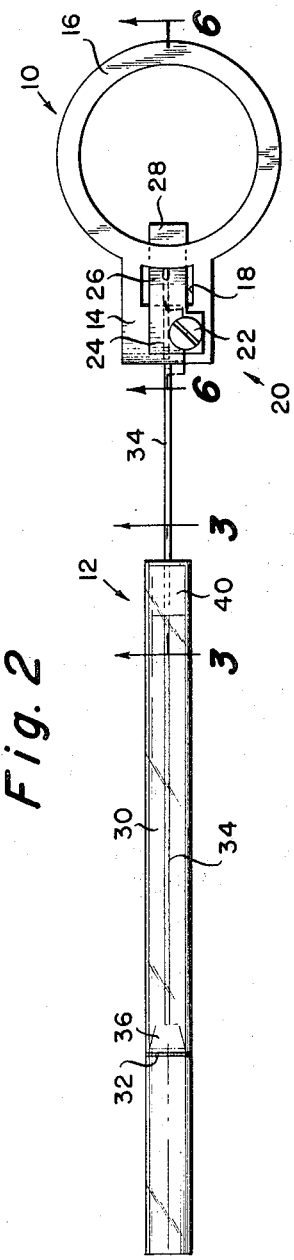
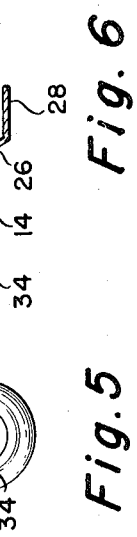
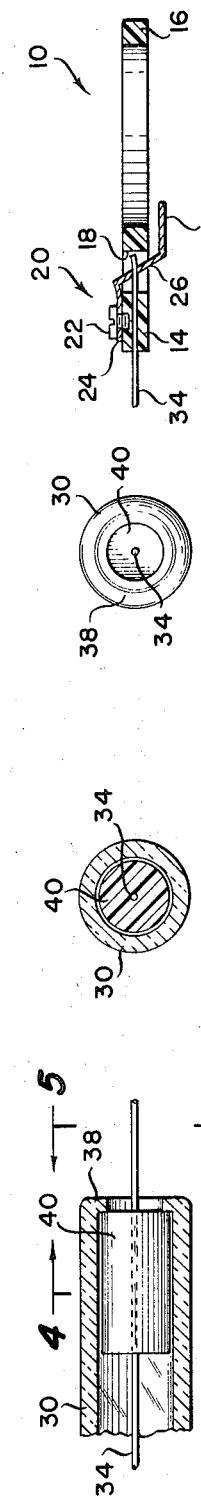

3,828,987

DISPENSING MICROPIPETTE APPARATUS HAVING DISPOSABLE PARTS FOR DELIVERING A PRESELECTED QUANTITY OF FLUID

This application is a continuation-in-part of application Ser. No. 75,203, filed Sept. 24, 1970.

BACKGROUND AND OBJECTS OF THE INVENTION

In the use of the micropipette dispensing apparatus set out in application Ser. No. 75,203, fluid is drawn into a capillary tube by operation of a plunger wire longitudinally movable through the capillary tube. As set out in that application, there is provided on the capillary tube, graduations to indicate when precise amounts of fluid have been drawn into the capillary tube, and with careful manipulation of the plunger member within the capillary tube by the user, accurate samples of the fluid are obtainable.

For many purposes, the amount of fluid dispensed must be very precise and consequently, where this operation is repeated over and over, it becomes a very time consuming and tedious task for the laboratory worker. In much of this work, also, it is the same amount of fluid which must be repeatedly drawn into and expelled from the capillary tube.

It is an object of this invention to facilitate and expedite the delivery of a precise amount of fluid from a capillary tube without the care and precision of the worker which has heretofore been required.

Another object is to provide apparatus of the character described which is calibrated to draw a maximum, precise, predetermined amount of fluid into the capillary tube without visual determination of the amount drawn therein.

Another object is to provide apparatus of the character described including a capillary tube equipped with stop means, and a wire plunger movable longitudinally through the capillary tube, the wire plunger being provided with a stop member engageable with the stop means to limit the extent of longitudinal movement of the wire plunger within the capillary tube and correspondingly limit the maximum amount of fluid drawn into the tube.

A further object is to provide apparatus of the character described wherein the parts thereof are disposable for replacement, and wherein interchangeable replacement parts may be provided for effecting maximum delivery of different quantities of fluid.

Other objects will be apparent from the following description of the presently preferred form of this invention taken in connection with the appended drawings.

DESCRIPTION OF FIGURES OF THE DRAWINGS

FIG. 1 is an elevational view of the micropipette dispensing apparatus of the present invention;

FIG. 2 is a view similar to FIG. 1 showing the apparatus in fully extended positon for drawing a maximum fluid sample therein;

FIG. 3 is an enlarged sectional view taken along the line 3—3 of FIG. 2 looking in the direction of the arrows;

FIG. 4 is a sectional view taken along the line 4—4 of FIG. 3 looking in the direction of the arrows;

FIG. 5 is a sectional view taken along the line 5—5 of FIG. 3 looking in the direction of the arrows; and FIG. 6 is a sectional view taken along the line 6—6 of FIG. 2.

DESCRIPTION OF THE INVENTION

The micropipette dispensing apparatus of the present invention generally includes a holder unit 10 to which is attached a filling and dispensing unit 12.

Holder unit 10 is preferably of the same construction as set out in our copending application Ser. No. 75,203 and includes a generally rectangular body 14 which issues at one end into a finger engaging loop 16. As shown in FIG. 6, body 14 is provided with a longitudinal bore which communicates with a cut out portion 18.

A substantially Z-shaped spring member 20 is secured to the body 14 by a screw 22, which member includes a substantially flat portion 24, a sloping portion 26 and an angular portion 28. Portion 26 is provided with a central circular opening which is in alignment with the longitudinal bore of body 14.

Filling and dispensing unit 12 includes a precision capillary tube 30 having a graduation marking 32 thereon to indicate a predetermined amount of fluid has been drawn into the tube. A wire plunger 34 is positioned within capillary tube 30 for longitudinal movement with respect thereto, for the purpose of admitting fluid to and dispensing fluid from, capillary tube 30. Wire plunger 34 is considerably smaller in diameter than the internal diameter of capillary tube 30, and one end thereof is inserted through the longitudinal bore of body 14 and through the opening in intermediate portion 26 of Z-shaped member 20, for releasably securing one terminal of the wire plunger in holder 10 in the manner set out in application Ser. No. 75,203.

The opposite terminal of wire plunger 34 is provided with a piston 36 of teflon or other suitable material, the external diameter of the outer portion of which is substantially equal to the internal diameter of capillary tube 30. It will be noted from FIGS. 1 and 2 that the peripheral wall of the piston 36 is tapered in order to facilitate insertion thereof into the capillary tube.

In accordance with the objects of the present invention, the end of capillary tube 30 remote from piston 36 is treated by fire polishing or the like to reduce the cross-sectional area of the bore to provide an annular flange or wall portion 38 which serves as a stop.

In connection with stop 38, wire plunger 34 is provided with a stop member 40 made of teflon or other suitable material which is fixedly engaged with the wire plunger at a predetermined distance from the outer terminal of piston 36. Stop member 40 is preferably of cylindrical shape and, as shown in FIG. 3, is slightly spaced from the wall of capillary tube 30. The position of stop member 40 on wire plunger 34 is calibrated so that upon movement of the wire plunger through capillary tube 30, member 40 will engage stop 38 at the same time that the outer terminal of piston 36 is uniplanar with graduation 32 of the capillary tube, thereby indicating a precise predetermined amount of fluid within the capillary tube without visual determination on the part of the user.

OPERATION

With the apparatus of the present invention in the position shown in FIG. 1, the lower end thereof is placed within the container of fluid to be drawn therein. Wire plunger 34 is then moved longitudinally through the capillary tube 30 by operation of finger loop 10, and then is immediately moved to the position shown in FIG. 2 whereupon further longitudinal movement of the plunger is prevented by virtue of engagement of stop member 40 with stop 38. This obviates the necessity of visual positioning of the bottom of the plunger opposite the granduation 32, and the consequent manipulation of the wire plunger by the operator which has previously been necessary. This operation may be repeated over and over quickly, with the assurance that every sampling of fluid drawn into the capillary tube will be a uniform precise amount.

When it is desired to replace plunger wire 34 and/or capillary tube 30, it is only necessary that angular portion 28 of member 20 be depressed in a manner illustrated and described in application Ser. No. 75,203. This releases the filling and dispensing unit 12 from holder 10, after which plunger wire 34 is pushed through the end of capillary tube 30 remote from annular stop 38.

With the apparatus of the present invention, precise, uniform samples of fluid may be repeatedly drawn into and dispensed from capillary tube 30 without the tedious and time consuming task of visually inspecting the sample to make sure that it precisely measures to the graduation line 32. This considerably facilitates sampling of the same quantity of fluid that is to be repeatedly drawn into the capillary tube and then expelled therefrom resulting in enabling the worker to work more efficiently and without fatigue.

The apparatus of this invention is of simple, economic construction, and although the stop means here employed constitute integral parts of the capillary tube and wire plunger, these features in no way interfere with the normal operation of the apparatus or with the disposability of the parts thereof.

It is of course to be understood that any desired quantity of fluid may be drawn into the capillary tube simply by relocating stop member 40 along the length of wire plunger 34 to vary the quantity of fluid which is drawn into the capillary tube before the stop member engages the annular stop. Various other changes may be made within the scope of the appended claims.

What we claim is:

1. Apparatus for delivering a preselected quantity of fluid including:
   a. a tubular member,
   b. the diameter of said tubular member being reduced at one terminal to provide a wall portion forming a stop,
   c. a wire plunger slidably movable through said tubular member,
   d. said wire plunger being in spaced relation to the side wall of said tubular member,
   e. said wire plunger including piston means at one end thereof of substantially the same diameter as the internal diameter of said tubular member,
   f. said wire plunger being enlarged at any selected point along its length in predetermined spaced relation to said piston means to form a stop member,
   g. said stop member engaging said stop to limit the longitudinal travel of said wire plunger and piston means through said tubular member, whereby a maximum precise quantity of fluid is drawn into said tubular member, and
   h. holder means in gripping engagement with the end of said wire plunger remote from said piston means,
   i. said holder means including a body portion for receiving a terminal of said wire plunger,
   j. a spring member mounted on said body portion and in frictional, retaining engagement with said wire plunger,
   k. said spring member being operable to release said wire plunger, whereby said wire plunger may be moved longitudinally out of said tubular member.

2. The apparatus of claim 1, with the addition of:
   a. a finger engaging loop affixed to one end of said body portion for facility in operating said holder means.

3. The apparatus of claim 1, wherein:
   a. said stop member is of generally cylindrical shape.

4. Apparatus for delivering a preselected quantity of fluid including:
   a. a tubular member,
   b. the diameter of said tubular member being reduced at one terminal to provide a wall portion forming a stop,
   c. indicia on the side wall of said tubular member a predetermined distance from the terminal of said tubular member opposite said wall portion forming a stop,
   d. a wire plunger slidably movable through said tubular member,
   e. said wire plunger being in spaced relation to the side wall of said tubular member,
   f. said wire plunger including piston means at one end thereof of substantially the same diameter as the internal diameter of said tubular member,
   g. said wire plunger being enlarged at any selected point between said piston means and said stop and in predetermined spaced relation to said piston means to form a stop member,
   h. said stop member engaging said stop to limit the longitudinal travel of said wire plunger through said tubular member,
   i. a terminal of said piston means being uniplanar with said indicia contemporaneously with the engagement of said stop and stop member, and
   j. a holder unit for gripping the terminal of said wire plunger remote from said piston means,
   k. said holder unit including a body portion,
   l. a finger engaging loop at one end of said body portion,
   m. a spring member secured to said body portion and in frictional engagement with said wire plunger,
   n. said spring member being operable to release said wire plunger, whereby said wire plunger may be removed longitudinally out of said tubular member.

5. The apparatus of claim 4, wherein:
   a. said tubular member is a capillary tube.

6. The apparatus of claim 5, wherein:
   a. said stop member is of cylindrical shape.

* * * * *